Dec. 26, 1967 R. J. LAHR 3,359,876

CONTINUOUS PAGE PRINTER

Filed May 18, 1965

2 Sheets-Sheet 1

INVENTOR.
ROY J. LAHR

BY John A. Brady

ATTORNEY

INVENTOR.
ROY J. LAHR
BY John A. Brady
ATTORNEY

United States Patent Office 3,359,876 Patented Dec. 26, 1967

3,359,876

CONTINUOUS PAGE PRINTER

Roy J Lahr, Lexington, Ky., assignor to International Business Machines Corporation, Armonk, N.Y., a corporation of New York Filed May 18, 1965, Ser. No. 456,704
22 Claims. (Cl. 95—4.5)

ABSTRACT OF THE DISCLOSURE

The preferred embodiment disclosed is a compact optical printer carrying transparencies with all of the letters and characters on one track of a circular member which is continuously rotated at high speed. Spaced inside of the transparencies are two strobe light systems mounted on an internal circular member and facing opposite directions. The strobes are continuously rotated relatively slowly. The special paper printed upon is wrapped around the printer and continuously moved in the line feed direction. The paper is disposed at an angle such that a new line advance occurs as the strobes make one-half revolution. The printer is an efficient one and delays for new line feeding operations are avoided.

*Background*

This invention relates to the art of high speed printing. More particularly, this invention relates to a printer characterized by high speed and good print quality. The invention is particularly well suited as an optical printer to produce masters for subsequent reproduction.

High speed display of information has been a severe and often limiting design criterion in the data processing and information communication arts. Improved electronic data processing equipments have been capable of generating final results at speeds severely taxing the ability of known structures to print out the results. Furthermore, the requirements for high speed communication of information grows daily as the population and complexity of human affairs grows. To meet these requirements, high speed display units have been developed.

A basic structural approach in many high speed printers has been the continuous revolution of a font of one or more groups of alphabetic, numeric, and special purpose character information past the print station. In some applications, as illustrated by the mechanical printers of many kinds, the font is in the form of slugs with the character outlines in the form of raised salients in the manner of the salients on the type die of a typewriter bar. In other known applications the font is in the form of transparencies to be used in conjunction with suitable optics. In all such applications high speed printing is obtained by the grate speed of interchange of each character available when the inertia of the font is overcome and the font is then continuously revolved past the print station at high speed. All of such systems may be termed revolving printers.

Revolving printers known in the prior art have been limited in speed by the "new line" operation. Although the revolving type fonts make possible great speeds during the printing of a single line, the spacing of paper for the new line requires the paper to accelerate against the inertia of the system, an inherently slow operation. The paper can not be moved continuously in many systems because the print capabilities of the revolving printer are not fast enough to prevent blurring and staggering of the printed characters along each printed line. In other applications the return of the type font to a starting position might be required before the initiation of a new line. This is analogous to the "carriage return" of more conventional printers and is inherently wasteful of time and complicating in structure.

It is an object of this invention to provide a revolving printer which is not limited in speed by the paper feed operation.

It is a more general object of this invention to provide a revolving printer of significantly increased capabilities for speed of display.

It is a more specific object of this invention to provide a practical, low cost high speed printer.

In accordance with this invention, the print receiving medium (usually paper) is fed continuously, thereby overcoming the problems of inertia inherent in a discontinuous feeding operation. The revolving type font of this invention is prearranged to travel continuously on a path intersecting the paper at an angle defining one line of print. The type font is thus operative at a print station which may be as large as one line of print. Thus, as the paper advances, each next succeeding character position on the same print line is presented to the revolving type font at a slightly later time. The entire speed of the display is thus fundamentally controlled by the speed of revolution of the type font since only enough time must be provided to allow the entire group of characters carried by the font to pass each print position. Paper feed speed is not a limiting factor.

It will be noted that the objectives of low cost and high speed are obtained without significant complications in structure. The invention is concerned with serial printers, of the type in which characters are received serially and analyzed for the firing of a print transferal means (such as a light flash or a print hammer) when the proper character carried as part of the type font is in the operative position. None of the prior art analyzing or printing means are complicated when used in conjunction with this invention. The invention is well suited for use in a communications link to receive signals from a message storing record at a transmitting location. The record need not contain a "new line" signal since the printer of this invention can advance automatically and without delay to each new line. Any structures and time delays associated with the carriage return of conventional teletypewriters are avoided.

In accordance with other aspects of this invention, a large pulurality of print transfered means is avoided. Instead, provision is made to revolve at least two print transfered means past the print station on the same track. The revolution speed of the print transferal means must be coordinated with respect to the revolution speed of the font so that an entire group of characters passes a character position while a single print transferal means is operative at that character position. Regardless of how a new line operation is accomplished, two displaced revolving print transferal means effect significant efficiencies in reducing the delay necessary for a print transferal means to assume a position desired. With the automatic line progression of the type above described, the second print transferal means can be approximately one line length behind the first, to thereby allow a second line to be initiated immediately after a first line is finished.

It is therefore a general object of this invention to provide a revolving printer having high speed but reduced structure.

It is a more specific object of this invention to provide a revolving printer with only two or a few print transferal means which is capable of printing at high speeds.

It will be noted that the invention provides a page printer. The prior art shows strip printers, and character positioning is obtained by moving the strip. The concept used in this invention of moving at least one print transferal means makes the printing of full pages practical.

In its preferred aspects, this invention takes the form of an optical revolving printer. Optical printers are of particular value in the reproduction art. Thus, optical systems have found exceptional utility in the photocomposing technology. The image created by optics can be one which is particularly suited to use as a master in a reproduction system. The output of this invention can be utilized to multiply copies by state of the art techniques in diazo, lithographic, and similar technologies. In the preferred device, a large number of print transferal means are not utilized since means are provided to continuously progress the optical system to the different display locations. This invention is further characterized in its preferred form by the use of at least two optical systems, both linked for rotation on the same track in relation to the print station. As one optical system finishes a printed line, the second optical system is at different point in the cycle, which point can be located for immediate printing of the next line.

It is therefore a further object of this invention to provide a high speed optical printer.

It is still further object of this invention to provide a revolving optical printer of significantly increased capabilities of speed and good quality display.

It is a more specific object of this invention to provide a practical, low cost-high speed optical printer.

In accordance with an important aspect of the preferred embodiment of this invention, therefore, a revolving printer is provided in which means are utilized to rotate both an optical font and optical printing means in proper coordination. The printer is capable of use simultaneously with more than one print receiving papers.

The foregoing and other objects, features and advantages of the invention will be apparent from the following more particular description of a preferred embodiment of the invention, as illustrated in the accompanying drawings.

Figure 1:
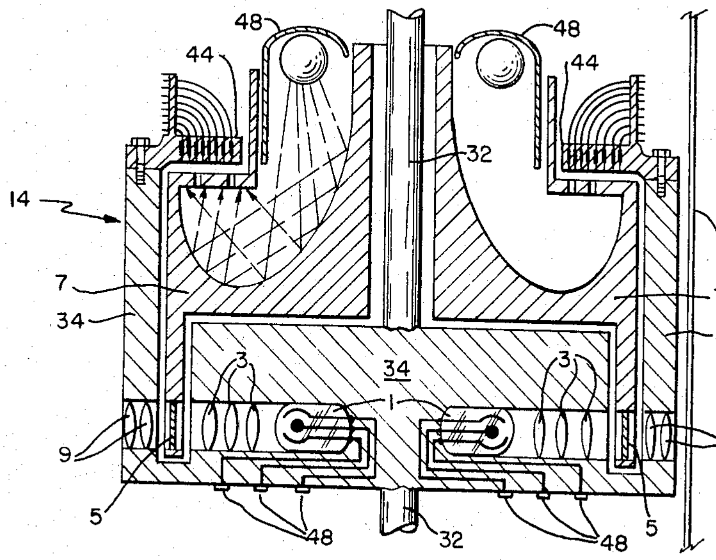
FIG. 1 illustrates a detail of the revolving portions of the preferred printer.

The preferred embodiment of this invention, shown in the drawings, is intended to optically print full-size characters on photosensitive paper. A font of characters in the form of masks is used. The masks block and transmit radiation in the shape of the desired output characters in the manner of a photographic transparency. The configuration allows page printing with no paper feed or carriage return delay. The printer can receive its input from a magnetic, paper tape or similar store or from a high speed message generator. Signals may be received from a long distance comunications line of the type analogous to teletypewriter communications. Significant points of novelty are believed to exist in the continuous feeding of angularly displaced paper and in the revolution and coordination of the optical source.

*Optical systems*

Reference is made to FIG. 1. The print element comprises basically a pulsed-arc or strobe lamp 1 of the type well known in the art. A lens system 3 collimates the light pulses produced by strobe lamp 1. A font of a preselected group of character masks 5 is mounted on a circulator 7 to allow the font to be revolved past a print station at high speeds. A reducing lens system 9 is provided to receive a character image from mask 5 and to focus that image on photosensitive material. The using of a revolving character mask illuminated by the high speed flash of a strobe lamp is, of course, known in the optical printing art.

*Paper feed angle*

Figure 2:
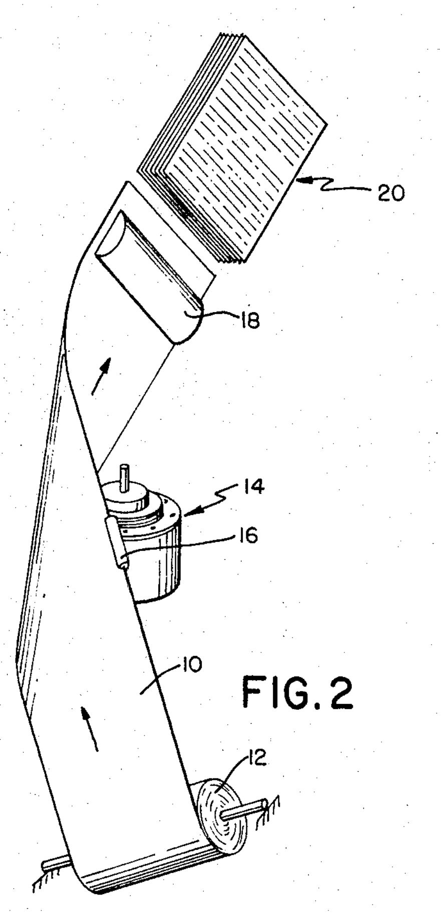
FIG. 2 illustrates a system utilizing the preferred printer.

As shown in FIG. 2, photosensitive paper 10 is fed from a supply roll 12 past the print station, at which the revolving printer, designated generally as 14, is located. The paper 10 may be supported at the print station by guides 16. The paper 10, which is fed continuously, progresses to a conventional developer station 18. The output, at a suitable output station 20, may be in continuous form or it may cut into pages as shown in FIG. 2.

The paper 10 is wrapped around revolving printer 14 so that somewhat more than one-half of the printer 14 is in juxtaposition with the paper 10. Lines of printing will be transferred to paper 10 in a regular order so that the display will have the series of successive lines usually associated with conventional printing. This is suggested by the dashed lines of the drawing. A significant feature of this invention is in the angle of feed of paper 10 in relation to the position of the track defined by the font of the optical printer 14. As best seen in FIG. 1, the font is carried on a track defined near the lower radius of printer 14. In accordance with this invention an angle is discovered by noting the angle between successive lines of print as defined by the dimensions related to the entire printer 14. This angle is an angle which is defined by a right triangle in which a hypotenuse and a long side bound the angle, and in which the long side is the length of a line printed by printer 14 while the short side of the triangle is the distance between printed lines. Character representations on each mask 5 should be disposed at this same angle, so that the printed characters will appear side by side.

*Printing*

The photosensitive paper is held a small distance (in the order of $\frac{3}{16}$ inch) from the outside of printer 14. The font container masks 5 and held by circulator 7 (FIG. 1) may be rotated at a speed in the order of 100 to 400 revolutions per minute. The rate of movement of paper 10 is continuous, but relatively slow (in the order of 0.6 inch per second). As will be described, each strobe system revolves in the printer 14, also at a relatively slow speed so that a strobe system is operative at a character print position during a time in which an entire group of characters, each on a mask 5, is carried past the character position by circulator 7.

As best illustrated in FIG. 1, two strobe systems, positioned opposite one another on revolver 34, are provided. The actual path of each strobe system across the surface of paper 10 is thus a series of horizontal lines, and each line on paper 10 can be printed upon. Printing is by flashing of strobe lamp 1 when a mask 5 carrying the proper character passes the optical system. The optical system, including lens systems 3 and 9 focuses the images contained on mask 5 onto the photosensitive paper 10. If the flash duration of the strobe system is relatively brief, the image applied to paper 10 will be sharp and distinct. Shortly later, a second image from a selected mask 5 can be focused on paper 10. The entire paper 10 can be exposed with an optical pattern in this way.

Development of the exposed paper 10 can be any state of the art technique. No criticality is herein claimed in the type of photosensitive paper used or in the manner of development. The paper 10, before development, may be kept in a dark environment or in a red light environment as required.

*The two strobe printer*

Figure 3:
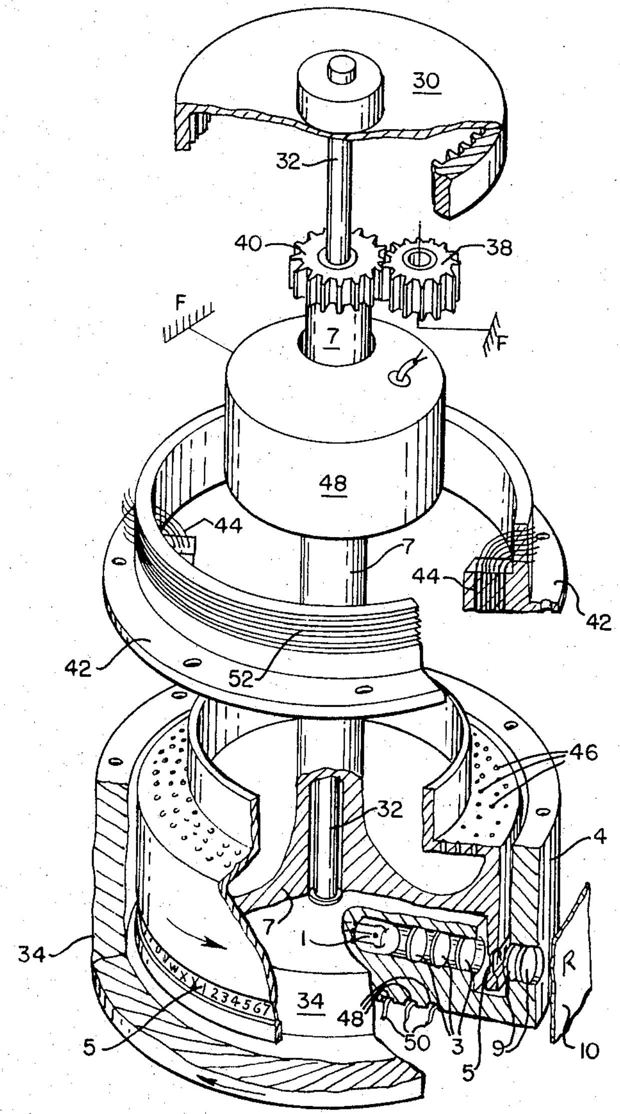
FIG. 3 illustrates the mechanisms of the preferred printer.

FIG. 3 shows a detail of the two strobe printer 14 which is the preferred embodiment of this invention. FIG. 1 is, of course, a section of certain parts of FIG. 3.

The printer 14 is capped by an internally toothed, drive cap 30. Constant, relatively slow torque is supplied at the bottom of printer 14 to drive shaft 32. Drive shaft 32 is integral with strobe and reducing system revolver 34.

Shaft 32 extends unimpeded through printer 14 until it is anchored to drive cap 30. Drive cap 30 forms an external gear in a gear system including idler gear 38 and driven gear 40. Idler gear 38 is anchored to any suitable frame F. As is immediately clear, a speed multiplication is transferred to gear 40, and this will be accentuated at the optical system by the fact that driven gear 40 rotates in the opposite angular direction from the rotation of drive shaft 32.

Driven gear 40 is integral with an extension of mask circulator 7. Thus, assuming a counterclockwise angular velocity of shaft 32, strobe and reducing system revolver 34 will turn at the angular velocity of shaft 32 in a counterclockwise direction. At the same time, mask circulator 7 is driven by gear 40 at a much greater speed and in the clockwise direction. As above mentioned, the speed of the optical system should be slow with respect to the speed of circulator 7 so that the optical system will be able to operate on an entire font of characters in one character location in the output before passing on to be operative at another character location in the output.

The remaining structure in printer has regard to the selection and print of the proper characters. As illustrated, a decoding ring 42 is bolted to revolver 34. Sensors 44 are located at two diametrically opposed points on ring 42. Thus, as the optical system, including strobe 1, revolves with revolver 34, optical sensors 44 shift in position. A code generating system is found in the form of transparent dots 46 on the top of circulator 7.

The center surface portions of circulator 7 form an optical reflector, as best shown in FIG. 1. Completing this system is code light housing 48, which is externally supported by the frame, since it does not rotate. Constantly illuminated lamps 49 are carried in the housing 48.

No criticality is claimed in the type of permutation coding which coordinates the position of circulator 7 with the revolver 34. It is well known in this and other arts that binary codes, whether generated by light or otherwise, can be created in predetermined combinations. Thus, each code mask 5 on circulator 7 is described in position by a predetermined light-dark pattern of dots 46 on the top of circulator 7.

When the letter "A," for example, is carried on a mask which is in operative position with a strobe lamp 1, the code pattern on the top of circulator 7 which is operative with sensors 44 will be one which is unique from the other code patterns. It might, for example, be one which illuminates on the second and fifth photodiodes found in sensor 44. Thus, a unique signal is created, which can be used to fire the strobe lamp 1 if the machine logic of the system calls for the printing of an "A."

Connections needed to the machine logic and back to the strobe lamp 1 also are not critical features of this invention. The sensors 44, although located internally at two diametrically opposite locations on ring 42, lead to conductors 52 which form radial semicircular bands on the outside of ring 42. Suitable stationary brushes can ride on these bands to thereby conduct signals to the machine logic. Similarly conductive rings 48 and wiping brushes 50, located on the bottom of printer 14, direct signals from machine logic to fire the strobe lamp 1.

It will now be apparent that the coordination of strobe position and mask position in accomplished by the system described. Movement of sensors 44 keeps "track" of the position of strobe 1. Movement of circulator 7 is directly with the movement of the masks 5 and therefore any signal sensed by a sensor 44 is indicative of a specific character carried on a specific mask. Brushes ride on conductive rings 52 to extract each code. Comparisons are made, and a strobe lamp 1 is fired by a signal from wipers 50 to conductive rings 48 when a proper mask 5 is in the proper position.

*Operation*

Operation of the novel aspects of this preferred embodiment may be understood with reference to the above descriptions of structures. During the period in which the optical axis of the optical system 1, 3, and 9 sweeps past the desired printing point, the circulator 7, containing the characters masks 5, must present all of a set of characters to the optical system so that any character in the set may be printed. A minimum outside diameter of the optical revolver appears at this time to be about six inches. About 180 different letters and symbols are used in normal printing. If a set of full size (approximately 0.080 x 0.100 inch) characters are to be used, one set could be used with a printer of six inch diameter. Thus, a full revolution of circulator 7 is required to bring all possible characters to the optical system.

Printing speeds of 250 characters per second at 10 to the inch are reasonably within the capabilities of this system. In the six inch printer with one group of masks, the strobe and reducing system revolver 34 must revolve at a tangential speed 25 inches per second and the circulator 7 must revolve once every $1/250$ second or at 15,000 r.p.m.

Assuming a total of 180 characters on 180 masks 5, each mask 5 passes by the print position in 22.2 microseconds. Thus, the lamp 1 should emit a light pulse in a time short compared to 22.2 $\mu$ sec. Mechanical shutters having an "open" time of a few microseconds are rare and usually bulky and inconvenient. For that reason, a pulse-arc lamp is preferred. Such a lamp, which can fire in one microsecond, is described in U.S. Patent 2,714,841. Experiments have indicated that an FX–6A lamp (product of Edgerton, Germeshausen and Grier, Boston, Mass.) will function satisfactorily in this system with many print character styles. Should blurring be a problem with other print character styles, a "high gamma" photosensitive material should be used as the paper 10. This is a material which effectively shortens a light pulse received because it responds substantially only to light above a substantial magnitude. Often, however, photosensitive materials of "slow silver" speed range (ASA 2 or less) can be used. Continuous development and other processing of such photosensitive material is well within the state of the art.

As one optical system revolves past the paper 10, the second optical system, being opposite on revolver 34, comes into print positon. Due to angle of paper 10, the second optical system is located to immediately begin printing on the next lowest line. Printing is continuous without "carriage return" type delay or other delay.

Figure 4:
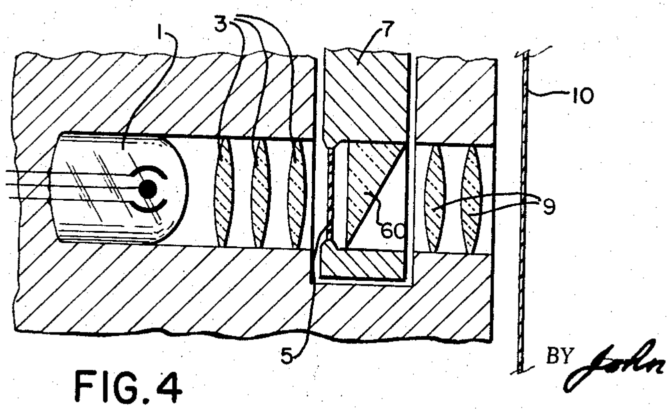
FIG. 4 is a detail of the optical path showing particularly a prism used for fine adjustment.

At each character print position, a different time of printing may occur depending upon which mask 5 is to be printed from. Staggered distances between characters printed could result. This may be compensated for by adjusting prisms carried in direct association with each mask 5, as shown in FIG. 4. Since each mask appears in a known order at each print location, proper orientation of the prism 50 can be pre-established, to assure that the image from the mask 5 will be displayed at a position which compensates for irregularities which would occur if each mask were displayed in a direct line from the strobe lamp 1. Such a prism system, each circulated adjacent a mask 5 on circulator 7 is preferred with this device. Other methods of compensation are within the scope of this invention also.

The revolving printer 14 is capable of simultaneous use with a plurality of print receiving papers. As shown in FIG. 2, one side of printer 14 is unused. However, a print initiator and font exist on the unused side and could be used to print on a second paper.

While the invention has been particularly shown and described with reference to preferred embodiments thereof, it will be understood by those skilled in the art that the foregoing and other changes in form and details may be made therein without departing from the spirit and scope of the invention.

I claim:

1. A continuous printer comprising:

a font carrying character information, means to revolve at a relatively high speed said font past a print station of length of at least two character widths as established by the dimensions of said continuous printer, at least one printer transferal means adapted to transfer individual character images from said font to a substrate material, means to normally continuously revolve at a relatively low speed said print transferal means past said print station, said print transferal means, when said print transferal means revolves past said print station, being mounted to be substantially on a straight line intersecting and perpendicular to the operative, character bearing surface of said font at said print station, and means to continuously feed substrate material past the length of said print station at an angle defined by the angle between preselected distances defining successive lines of material printed by said continuous printer.

2. The combination as in claim 1 wherein said character information carried by said font is disposed at an angle corresponding to said angle of feed to thereby provide a printed display of parallel aligned characters.

3. A continuous printer comprising:

a font carrying character information, means to revolve at a relatively high speed said font past a print station of length of at least two character widths as established by the dimensions of said continuous printer, at least two print transferal means each adapted to transfer individual character images from said font to a substrate material, means to normally continuously revolve at a relatively low speed all said print transferal means past said print station, all said print transferal means being revolved on the same track and being displaced longitudinally on said track at least one character width as established by the dimensions of said continuous printer, each said at least two print transferal means, when each said at least two print transferal means revolves past said print station, being mounted to be substantially on straight line intersecting and perpendicular to the operative, character bearing surface of said font at said print station, and means to continuously feed substrate material past the length of said print station at an angle defined by the angle between preselected distances defining successive lines of material printed by said continuous printer.

4. The combination as in claim 3 wherein said character information carried by said font is disposed at an angle corresponding to said angle of feed to thereby provide a printed display of parallel aligned characters.

5. The combination as in claim 3 wherein said print station is at least several characters in length and two of said print transferal means are displaced longitudinally on said track at least one line length as established by the dimensions of said continuous printer.

6. The combination as in claim 4 wherein said print station is at least several characters in length and two of said print transferal means are displaced longitudinally on said track at least one line length as established by the dimensions of said continuous printer.

7. A continuous printer comprising:

a font of transparencies each carrying character information, means to revolve at a relatively high speed said font past a print station of length of at least two character widths as established by the dimensions of said continuous printer, at least one high speed optical system adapted to direct radiation through individual of said transparencies as said transparencies are revolved, to a radiation sensitive material, means to normally continuously revolve at a relatively low speed said high speed optical system past said print station, said optical system when said optical system revolves past said print station, being mounted to be substantially on a straight line intersecting and perpendicular to the operative, character bearing surface of said font at said print station, and means to continuously feed radiation sensitive material past the length of said print station at an angle defined by the angle between preselected distances defining successive lines of material printed by said continuous printer.

8. The combination as in claim 7 wherein said character information carried by said type font is disposed at an angle corresponding to said angle of feed to thereby provide a printed display of parallel aligned characters.

9. A continuous printer comprising:

a font of transparencies each carrying character information, means to revolve at a relatively high speed said font past a print station of length of at least two character widths as established by the dimensions of said continuous printer, at least two high speed optical systems adapted to direct radiation through individual of said transparencies as said transparencies are revolved, to a radiation sensitive material, means to normally continuously revolve at a relatively low speed all said high speed optical systems past said print station, all said high speed optical systems being revolved on the same track and being displaced longitudinally on said track at least one character width as established by the dimensions of said continuous printer, and means to continuously feed radiation sensitive substrate material past the length of said print station at an angle defined by the angle between preselected distances defining successive lines of material printed by said continuous printer.

10. The combination as in claim 9 wherein said character information carried by said font is disposed at an angle corresponding to said angle of feed to thereby provide a printed display of parallel aligned characters.

11. The combination as in claim 9 wherein said print station is at least several characters in length and two of said high speed optical systems are displaced longitudinally on said track at least one line length as established by the dimensions of said continuous printer.

12. The combination as in claim 10 wherein said print station is at least several characters in length and two of said high speed optical systems are displaced longitudinally on said track at least one line length as established by the dimensions of said continuous printer.

13. In a revolving printer having a normally continuously revolvable font carrying character information adapted to transfer character images upon initiation of said transfer by a print transferal means, at least one print transferal means mounted for repetitive, normally continuous revolution past a print station of length of at least two character widths as established by the dimensions of said revolving printer, said print transferal means, when said print transferal means revolves past said print station, being mounted to be substantially on a straight line intersecting and perpendicular to the operative, character bearing surface of said font at said print station.

14. In an optical printer having a moveable font of transparencies carrying character information adapted to transfer character images upon illumination by an optical system, at least one high speed optical system mounted for repetitive, normally continuous revolution past a print station of length of at least two character widths as established by the dimension of said optical printer for printing through transparencies to a radiation receptive substrated, said high speed optical system, when said high speed optical system revolves past said print station, being mounted to be substantially on a straight line intersecting and perpendicular to the operative, character bearing surface of said font at said print station.

15. In a printer having a moveable font carrying character information adapted to transfer character images upon initiation of said transfer by a print transferal means, at least two print transferal means mounted for repetitive, normally continuous revolution on the same track, each said at least two print transferal means, when each said at least two print transferal means revolves past said print station, being mounted to be substantially on a straight line intersecting and perpendicular to the operative, character bearing surface of said font at said print station.

16. The printer of claim 15 also comprising:

means to print alternate lines of information with different of said print transferal means,

17. In an optical printer having a moveable font of transparencies carrying character information adapted to transfer character images upon illumination by an optical system, at least two high speed optical systems mounted for repetitive, normally continuous revolution on the same track for printing through transparencies to a radiation receptive substrate, each said at least two high speed optical system, when each said at least two high speed optical system revolves past said print station, being mounted to be substantially on a straight line intersecting and perpendicular to the operative, character bearing surface of said font at said print station.

18. The printer as in claim 17 also comprising:

means to print alternate lines of information with different of said high speed optical systems.

19. In a high speed printer having a moveable font carrying character information adapted to transfer character images upon initiation of said transfer by a print transferal means, at least two print transferal means mounted for repetitive, normally continuous revolution on the same track past a print station of length of at least two character widths as established by the dimensions of said high speed printer, each said at least two print transferal means, when each said at least two print transferal means revolves past said print station, being mounted to be substantially on a straight line intersecting and perpendicular to the operative, character bearing surface of said font at said print station.

20. The printer of claim 19 also comprising:

means to print alternate lines of information with different of said print transferal means.

21. In a high speed optical printer having a moveable font of transparencies carrying character information adapted to transfer character images upon illumination by an optical system, at least two high speed optical systems mounted for repetitive, normally continuous revolution on the same track past a print station of length of at least two character widths as established by the dimensions of said optical printer for printing through transparencies to a radiation receptive substrate, each said at least two high speed optical system, when each said high speed optical system revolves past said print station, being mounted to be substantially on a straight line intersecting and perpendicular to the operative, character bearing surface of said font at said print station.

22. The printer as in claim 21 also comprising:

means to print alternate lines of information with different of said optical systems.

References Cited

UNITED STATES PATENTS

| | | | |
|---|---|---|---|
| 2,379,880 | 7/1945 | Burgess | 178—15 |
| 2,692,551 | 10/1954 | Potter | 101—93 |
| 2,736,770 | 2/1956 | McNaney | 178—15 |
| 2,951,121 | 8/1960 | Conrad | 178—23 |
| 3,006,259 | 10/1961 | Blakely | 95—4.5 |
| 3,252,392 | 5/1966 | Ward | 95—4.5 |

JOHN M. HORAN, *Primary Examiner.*